(12) United States Patent
Wei et al.

(10) Patent No.: US 11,868,511 B2
(45) Date of Patent: Jan. 9, 2024

(54) DIGITAL FINGERPRINT GENERATOR AND METHOD FOR GENERATING DIGITAL FINGERPRINT

(71) Applicants: Beijing BOE Technology Development Co., Ltd., Beijing (CN); BOE Technology Group Co., Ltd., Beijing (CN)

(72) Inventors: Xiangye Wei, Beijing (CN); Yiming Bai, Beijing (CN); Liming Xiu, Beijing (CN)

(73) Assignees: Beijing BOE Technology Development Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/794,142

(22) PCT Filed: Aug. 5, 2021

(86) PCT No.: PCT/CN2021/110872
§ 371 (c)(1),
(2) Date: Jul. 20, 2022

(87) PCT Pub. No.: WO2022/062711
PCT Pub. Date: Mar. 31, 2022

(65) Prior Publication Data
US 2023/0070146 A1    Mar. 9, 2023

(30) Foreign Application Priority Data
Sep. 28, 2020 (CN) .......................... 202011043474.6

(51) Int. Cl.
*G06F 21/73* (2013.01)
*H04L 9/06* (2006.01)

(52) U.S. Cl.
CPC ................. *G06F 21/73* (2013.01); *H04L 9/06* (2013.01)

(58) Field of Classification Search
CPC .................................. G06F 21/73; H04L 9/06
USPC ........................................................ 713/189
See application file for complete search history.

(56) References Cited

U.S. PATENT DOCUMENTS

| 7,886,176 B1* | 2/2011 | Svoiski | H03L 7/0816 327/158 |
| 10,686,458 B1* | 6/2020 | Xiu | H03L 7/18 |
| 2003/0185392 A1* | 10/2003 | Sun | G06F 7/588 380/46 |
| 2013/0138710 A1* | 5/2013 | Yamamoto | G09C 1/00 708/250 |

(Continued)

*Primary Examiner* — Dereena T Cattungal
(74) *Attorney, Agent, or Firm* — IPRO, PLLC (57) ABSTRACT

Provided is a digital fingerprint generator. The digital fingerprint generator includes: a control circuit, configured to generate a control word; a first pulse generation circuit, connected to the control circuit, and configured to output a first pulse signal in response to the control word; a second pulse generation circuit, connected to the control circuit, having a same structure as the first pulse generation circuit, and configured to output a second pulse signal in response to the control word; and an output circuit, connected to the first pulse generation circuit and the second pulse generation circuit, and configured to output a digital fingerprint based on the first pulse signal and the second pulse signal according to a predetermined first rule.

18 Claims, 6 Drawing Sheets

(56) References Cited

U.S. PATENT DOCUMENTS

| | | | |
|---|---|---|---|
| 2015/0067895 A1* | 3/2015 | Vasyltsov | H04L 9/3278 |
| | | | 726/32 |
| 2019/0238143 A1* | 8/2019 | Xiu | G06F 1/04 |
| 2022/0045703 A1* | 2/2022 | Wei | G06F 1/08 |
| 2022/0180001 A1* | 6/2022 | Wei | G06F 1/06 |

* cited by examiner

DIGITAL FINGERPRINT GENERATOR AND METHOD FOR GENERATING DIGITAL FINGERPRINT

CROSS-REFERENCE TO RELATED APPLICATION

This application is a U.S. national stage of international application No. PCT/CN2021/110872, filed on Aug. 5, 2021, which claims priority to Chinese Patent Application No. 202011043474.6, filed on Sep. 28, 2020, and entitled "DIGITAL FINGERPRINT GENERATOR AND DIGITAL FINGERPRINT GENERATION METHOD," the disclosures of which are incorporated herein by reference in their entireties.

TECHNICAL FIELD

The present disclosure relates to a digital fingerprint generator, and a method for generating a digital fingerprint.

BACKGROUND

A digital fingerprint is important digital credentials in scenarios such as device authentication, authorization, and data encryption.

SUMMARY

Embodiments of the present disclosure provide a digital fingerprint generator and a method for generating a digital fingerprint.

At least one embodiment of the present disclosure provides a digital fingerprint generator, and the digital fingerprint generator includes:
- a control circuit, configured to generate a control word;
- a first pulse generation circuit, connected to the control circuit, and configured to output a first pulse signal in response to the control word;
- a second pulse generation circuit, connected to the control circuit, having a same structure as the first pulse generation circuit, outputting a second pulse signal in response to the control word, wherein each of the first pulse signal and the second pulse signal includes a first frequency signal and a second frequency signal, probabilities of occurrence of the first frequency signal and the second frequency signal being controlled by the control word; and
- an output circuit, connected to the first pulse generation circuit and the second pulse generation circuit, and configured to output a digital fingerprint based on the first pulse signal and the second pulse signal according to a predetermined first rule.

Optionally, the first pulse generation circuit include:
- a frequency synthesizer, connected to the control circuit and the output circuit.

The frequency synthesizer is configured to generate the first pulse signal in response to reference pulse signals with uniformly spaced phases, and the control word.

The control word includes a first coefficient and a second coefficient.

The first pulse signal includes the first frequency signal generated based on the reference pulse signals and the first coefficient, and the second frequency signal generated based on the reference pulse signals and the first coefficient, wherein a ratio of the first frequency signal to the second frequency signal in the first pulse signal is controlled by the second coefficient.

Optionally, the first rule may include: outputting the digital fingerprint based on a sequence of rising edges of the first pulse signal and the second pulse signal; or outputting the digital fingerprint based on a sequence of falling edges of the first pulse signal and the second pulse signal.

Optionally, the output circuit may include a D flip-flop.

A data input terminal of the D flip-flop is connected to the first pulse generation circuit, and a clock input terminal of the D flip-flop is connected to the second pulse generation circuit.

The D flip-flop is configured to output the digital fingerprint based on the sequence of the rising edges of the first pulse signal and the second pulse signal.

Optionally, the digital fingerprint generator may further include:
- a signal generator, connected to the first pulse generation circuit and the second pulse generation circuit, and configured to generate a plurality of reference pulse signals with uniformly spaced phases.

Optionally, the signal generator may further be connected to the control circuit.

The control circuit is configured to send an initial phase control instruction to the signal generator, the initial phase control instruction being configured to control initial phases of the reference pulse signals generated by the signal generator, wherein different digital fingerprints are output in the case that the initial phases of the reference pulse signals are different.

Optionally, the control circuit is configured to receive a first control signal, and update at least one of the output control word and the initial phase control instruction in response to the first control signal.

Optionally, the control circuit may further be connected to the output circuit.

The control circuit is configured to acquire the digital fingerprint output by the output circuit, and simplify the digital fingerprint by extracting data, in one period, of the digital fingerprint, and deleting data of in the other periods, wherein the periods are determined based on a number of paths of the reference pulse signals, and the control word.

At least one embodiment of the present disclosure provides a method for generating a digital fingerprint. The method includes:
- acquiring a control word;
- outputting a first pulse signal in response to the control word;
- outputting a second pulse signal in response to the control word, wherein the first pulse signal and the second pulse signal are generated by circuits with a same structure, each of the first pulse signal and the second pulse signal includes a first frequency signal and a second frequency signal, and probabilities of occurrence of the first frequency signal and the second frequency signal are controlled by the control word; and
- outputting a digital fingerprint, based on the first pulse signal and the second pulse signal, according to a predetermined first rule.

Optionally, outputting the first pulse signal in response to the control word includes:
- generating the first pulse signal in response to reference pulse signals with uniformly spaced phases, and the control word.

The control word includes a first coefficient and a second coefficient.

The first pulse signal includes the first frequency signal generated based on the reference pulse signals and the first coefficient, and the second frequency signal generated based on the reference pulse signals and the first coefficient, wherein a ratio of the first frequency signal to the second frequency signal in the first pulse signal is controlled by the second coefficient.

Optionally, the first rule includes: outputting the digital fingerprint based on a sequence of rising edges of the first pulse signal and the second pulse signal; or outputting the digital fingerprint based on a sequence of falling edges of the first pulse signal and the second pulse signal.

Optionally, the method further includes:
receiving a first control signal; and
updating at least one of the control word and an initial phase control instruction in response to the first control signal, wherein the initial phase control instruction is configured to control initial phases of the reference pulse signals.

Optionally, the method further includes:
acquiring the output digital fingerprint, and simplifying the digital fingerprint by extracting data, in one period, of the digital fingerprint, and deleting data in the other periods, wherein the periods are determined based on a number of paths of the reference pulse signals, and the control word.

DETAILED DESCRIPTION

To make the principle and advantages of the present disclosure clearer, the embodiments of the present disclosure will be further described in detail hereafter with reference to the accompanying drawings.

With improvement of communication technologies and popularization of Internet of everything technologies, an informatization level has been gradually improved, and an amount of data generated by a device has been exponentially increased. Some of the data involves personal privacy, some involves personal or public property, and some involves national defense security. If the data are stolen or tampered with, unpredictable losses are caused. Therefore, how to ensure security of the data in storage, transmission, and other cases is particularly important.

In the related art, a digital fingerprint is usually generated by software. In this way, the output digital fingerprint cannot be ensured to be unique, and reliability is not high enough.

The present disclosure proposes a physical unclonable function (PUF) circuit, also referred to as a digital fingerprint circuit. Even if digital fingerprint circuits with a same structure are to be cloned, generated digital fingerprints are different. The "fingerprint" herein is referred to as a characteristic of the circuit or a chip. During manufacturing process of a circuit, the circuit performance is deviated from design due to process errors. These deviations are extracted and converted into a digital feature. The digital feature becomes a digital fingerprint of the circuit or chip. The digital fingerprint is used to complete device authentication and authorization, data encryption and decryption, and other operations to ensure security of data storage and transmission. The digital fingerprint circuit has features of low power consumption and a small area, and is a digital circuit, which is easy to reuse and transplant, and suitable for integration into Internet of Things terminal chips.

Figure 1:
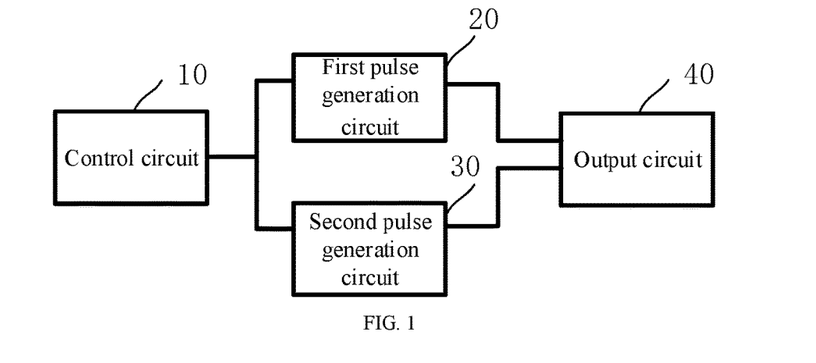
FIG. 1 is a schematic structural diagram of a digital fingerprint generator according to an embodiment of the present disclosure.

FIG. 1 is a schematic structural diagram of a digital fingerprint generator according to an embodiment of the present disclosure. Referring to FIG. 1, the digital fingerprint generator includes a control circuit 10, a first pulse generation circuit 20, a second pulse generation circuit 30, and an output circuit 40.

The control circuit 10 is configured to generate a control word. The first pulse generation circuit 20 is connected to the control circuit 10, and configured to output a first pulse signal in response to the control word. The second pulse generation circuit 30 is connected to the control circuit 10. The second pulse generation circuit 30 has a same structure as the first pulse generation circuit 20. The second pulse generation circuit 30 is configured to output a second pulse signal in response to the control word. Each of the first pulse signal and the second pulse signal includes a first frequency signal and a second frequency signal. Probabilities of occurrence of the first frequency signal and the second frequency signal are controlled by the control word. The output circuit 40 is connected to the first pulse generation circuit 20 and the second pulse generation circuit 30. The output circuit 40 is configured to output a digital fingerprint, based on the first pulse signal and the second pulse signal, according to a predetermined first rule.

Each of the first pulse signal and the second pulse signal includes the first frequency signal and the second frequency signal means that, the first pulse signal includes the first frequency signal and the second frequency signal, and the second pulse signal includes the first frequency signal and the second frequency signal.

The second pulse generation circuit 30 has the same structure as the first pulse generation circuit 20 means that, design of the second pulse generation circuit 30 is the same as design of the first pulse generation circuit 20. That is, the two have a same circuit structure, and are manufactured by devices of a same type and batch, and a same manufacturing process. However, due to factors such as manufacturing process and device errors, structure characteristics of the two circuits cannot be completely the same, resulting in different output signals. For example, in the case that the second pulse generation circuit 30 and the first pulse generation circuit 20 output a same signal, waveforms of the signal are not completely the same.

In an embodiment of the present disclosure, two pulse generation circuits with a same structure are configured to generate a pulse. The circuit structure characteristics cannot be completely the same due to the factors such as the manufacturing process and device errors. In this way, periods of the pulse signals output by the two pulse generation circuits cannot be completely aligned even if based on the same control word. In addition, impact of the circuit structure characteristics on each period is unpredictable, such that sequence of corresponding periods of the pulse signals output by the two pulse generation circuits is irregular. A sequence relationship of the corresponding periods of the pulse signals is converted into a digital fingerprint. The digital fingerprint is unpredictable and unique.

For example, the output circuit 40 is configured to output the digital fingerprint based on a sequence of rising edges of the first pulse signal and the second pulse signal. Alternatively, the output circuit 40 is configured to output the digital fingerprint based on a sequence of falling edges of the first pulse signal and the second pulse signal. In other words, a first rule as described above is outputting the digital fingerprint based on the sequence of the rising edges, or outputting the digital fingerprint based on the sequence of the falling edges.

Exemplarily, the sequence of the rising edges of the corresponding periods in the first pulse signal and the second pulse signal may be converted into a bit 0/1. For example, 0 is output in the case that the rising edge of a period in the first pulse signal is ahead of the rising edge of the corresponding period in the second pulse signal, and 1 is output in the case that the rising edge of the period in the first pulse signal is after the rising edge of the corresponding period in the second pulse signal.

The corresponding periods are referred to as periods with a same sequence number. For example, the first period of the first pulse signal and the first period of the second pulse signal are corresponding periods, and the second period of the first pulse signal and the second period of the second pulse signal are corresponding periods. By analogy, the nth period of the first pulse signal and the nth period of the second pulse signal are corresponding periods.

Different structure characteristics may be caused by differences in the manufacturing processes or differences in materials and components. These differences result in differences in signal transmission speed and processing speed.

Digital fingerprints output by different digital fingerprint generators are different due to differences in circuit structure characteristics. In this way, the digital fingerprint can be used as a fingerprint of a circuit.

In a possible implementation, the control circuit 10 may be configured to generate the control word according to a first rule. For example, the control word may be randomly output from a predefined control word set, and the randomly generated controls word are different each time.

For example, the control circuit 10 may include a control block, for example, realized by a programmable chip. The control word set is defined by programming, such that a range of the randomly output control word is defined.

In other possible implementations, the first rule may alternatively be other rules, such as selecting control words in sequence, which is not limited in the present disclosure.

Figure 2:
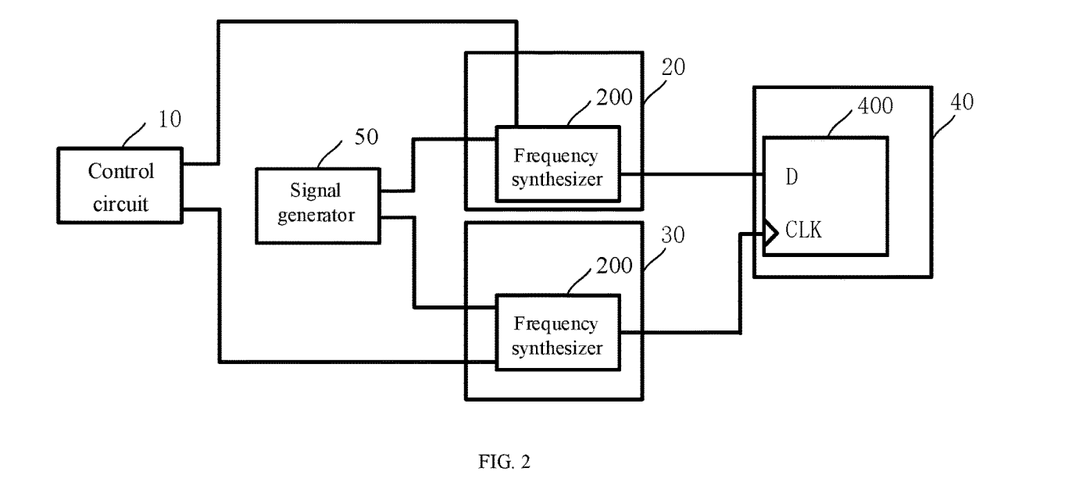
FIG. 2 is a detailed schematic structural diagram of a digital fingerprint generator according to an embodiment of the present disclosure.

FIG. 2 is a detailed schematic structural diagram of a digital fingerprint generator according to an embodiment of the present disclosure. Referring to FIG. 2, the first pulse generation circuit 20 includes a frequency synthesizer 200 connected to the control circuit 10 and the output circuit 40. The second pulse generation circuit 30 has a same structure as the first pulse generation circuit 20.

The frequency synthesizer 200 is configured to generate the first pulse signal in response to reference pulse signals with uniformly spaced phases, and the control word.

The control word includes a first coefficient and a second coefficient. The first pulse signal includes the first frequency signal generated based on the reference pulse signals and the first coefficient, and the second frequency signal generated based on the reference pulse signals and the first coefficient. A ratio of the first frequency signal to the second frequency signal in the first pulse signal is controlled by the second coefficient.

For example, a relationship between the first coefficient and the second coefficient may be as follows: A sum of the first coefficient and the second coefficient is the control word. For example, the first coefficient is as an integer part of the control word, and the second coefficient is as a fractional part of the control word.

Referring to FIG. 2, the digital fingerprint generator further includes a signal generator 50. The signal generator 50 is connected to the first pulse generation circuit 20 and the second pulse generation circuit 30, and configured to generate a plurality of paths of reference pulse signals with uniformly spaced phases.

Figure 3:
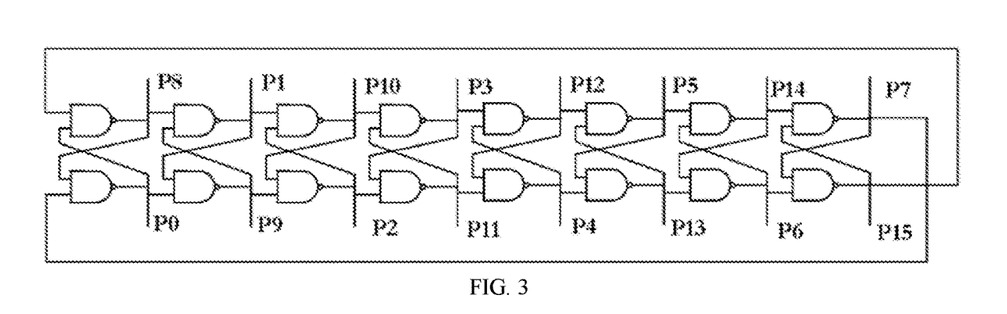
FIG. 3 is a schematic structural diagram of a ring oscillator (RO) in FIG. 2.

Exemplarily, the signal generator 50 may be a ring oscillator (RO). FIG. 3 is a schematic structural diagram of the ring oscillator. Referring to FIG. 3, the RO includes a plurality of NAND gates that are connected to form a ring. The ring oscillator has a plurality of pins P0 to P15. One of the plurality of pins may be used as an input terminal to be input one path of initial pulse signal. The initial pulse signal is delayed upon passing through the NAND gate. The other pins are used as output terminals to output the plurality of paths of reference pulse signals with uniformly spaced phases.

The plurality of paths of reference pulse signals with uniformly spaced phases mean that phase changes of the plurality of pulse signals generated by the signal generator 50 are the same, and intervals of initial phases of the plurality of paths of pulse signals are equal.

Figure 4:
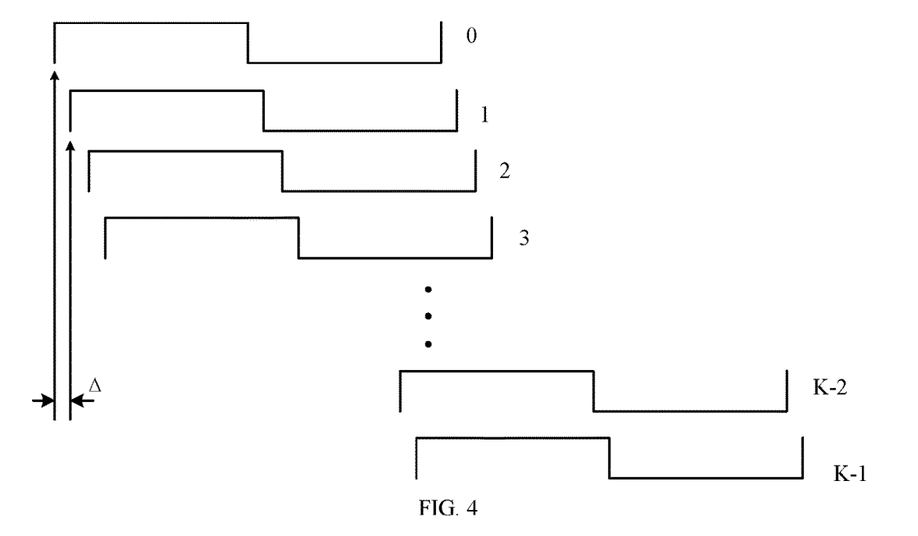
FIG. 4 is a diagram of waveforms of K paths of reference pulse signals, with uniformly spaced phases, generated by a signal generator in FIG. 2.

FIG. 4 is a diagram of waveforms of K paths of reference pulse signals, with uniformly spaced phases, generated by the signal generator in FIG. 2. Referring to FIG. 4, waveforms of any two paths of signals are the same (that is, periods and amplitudes are the same). The waveforms of the K paths of signals are uniformly arranged. That is, the intervals are equal. A phase difference between any two adjacent signals is a basic time unit $\Delta$. Each of the K paths of signals has a frequency $f_i$, and K is an integer greater than 2.

In an implementation of this embodiment of the present disclosure, the frequency synthesizer 200 is configured to generate the pulse signal based on the following formula:

$$T_{TAF}=(1-r) \times T_A + r \times T_B, \; T_A = I \times \Delta, \; T_B = (I+1) \times \Delta$$

$$T_{TAF}=(1-r) \times I \times \Delta + r \times (I+1) \times \Delta = (I+r) \times \Delta, \text{ and the control word } F = I + r. \tag{1}$$

$T_{TAF}$ represents a period of the pulse signal. $T_A$ represents the first frequency signal (also referred to as a first periodic signal). $T_B$ represents the second frequency signal (also referred to as a second periodic signal) described above. I represents the first coefficient described above, configured to select signals from the K paths of reference pulse signals, so as to synthesize a pulse signal. r represents the second coefficient described above, configured to control probabilities of occurrence of the first frequency signal and the second frequency signal. r controls the probability of occurrence of $T_B$, and 1−r controls the probability of occurrence of $T_A$.

For example, in the case that control word I is 3, and control word r is 0.5, in a first period, two paths of reference pulse signals with a phase difference of 3Δ are selected from the K paths of reference pulse signals, and thereby $T_A$=3Δ is synthesized and output; in a second period, two paths of reference pulse signals with a phase difference of 4Δ are selected, and thereby $T_B$=4Δ is synthesized and output. Δ is the phase difference between any two adjacent signals of the K paths of reference pulse signals with uniformly spaced phases.

In this embodiment of the present disclosure, the control words may be an integer or a decimal. Each of the control word may be divided into an integer part and a fractional part. The pulse signal may be synthesized by using the integer part as the first coefficient, and using the fractional part as the second coefficient. For example, in the case that the control word is 5.4, the integer part is 5, and the fractional part is 0.4. For another example, in the case that the control word is 6, the integer part is 6, and the fractional part is 0.

Figure 5:
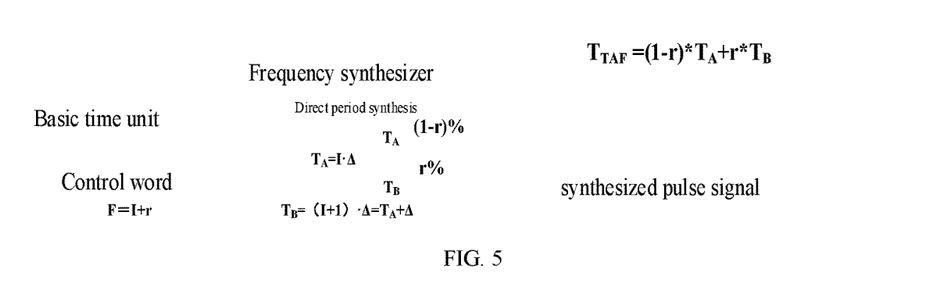
FIG. 5 is a schematic diagram of a principle of synthesizing a pulse signal by a frequency synthesizer.

FIG. 5 is a schematic diagram of a principle of synthesizing a pulse signal by a frequency synthesizer. Referring to FIG. 5, the frequency synthesizer synthesizes and outputs the pulse signal by time-average-frequency. The synthesis of the first pulse signal is taken as an example for description hereafter. The frequency synthesizer receives the control word and the K paths of reference pulse signals with uniformly spaced phases. The control word F=I+r, wherein I is the integer part and r is the fractional part. The phase difference between any two adjacent signals of the K paths of reference pulse signals with uniformly spaced phases is the basic time unit Δ. The frequency synthesizer first constructs two different clock periods $T_A$ and $T_B$ based on the basic time unit Δ and the integer part I of the control word F, wherein $T_A$=IΔ, and $T_B$=(I+1)Δ, and $T_B$ is greater than $T_A$. A duration of the high level (or low level) of $T_B$ is longer $T_A$, as shown in FIG. 5. Then, the frequency synthesizer controls, based on the fractional part r of the control word F, the probabilities of occurrence of $T_A$ and $T_B$, that is, the ratio described above of the first frequency signal to the second frequency signal, to generate the pulse signal.

The fractional part of the control word has an impact on probabilities of occurrence of $T_A$ and $T_B$. In the case that the fractional part is 0.5, the probability of occurrence of $T_A$ is equal to the probability of occurrence of $T_B$. Referring to the pulse signal shown in FIG. 5, $T_A$ occurs alternately with $T_B$. In the case that the fractional part is less than 0.5, the probability of occurrence of $T_A$ is greater than the probability of occurrence of $T_B$. In a special case that the fractional part is 0, and the pulse signal only has a portion of $T_A$. In the case that the fractional part is greater than 0.5, the probability of occurrence of $T_B$ is greater than the probability of occurrence of $T_A$.

Figure 6:
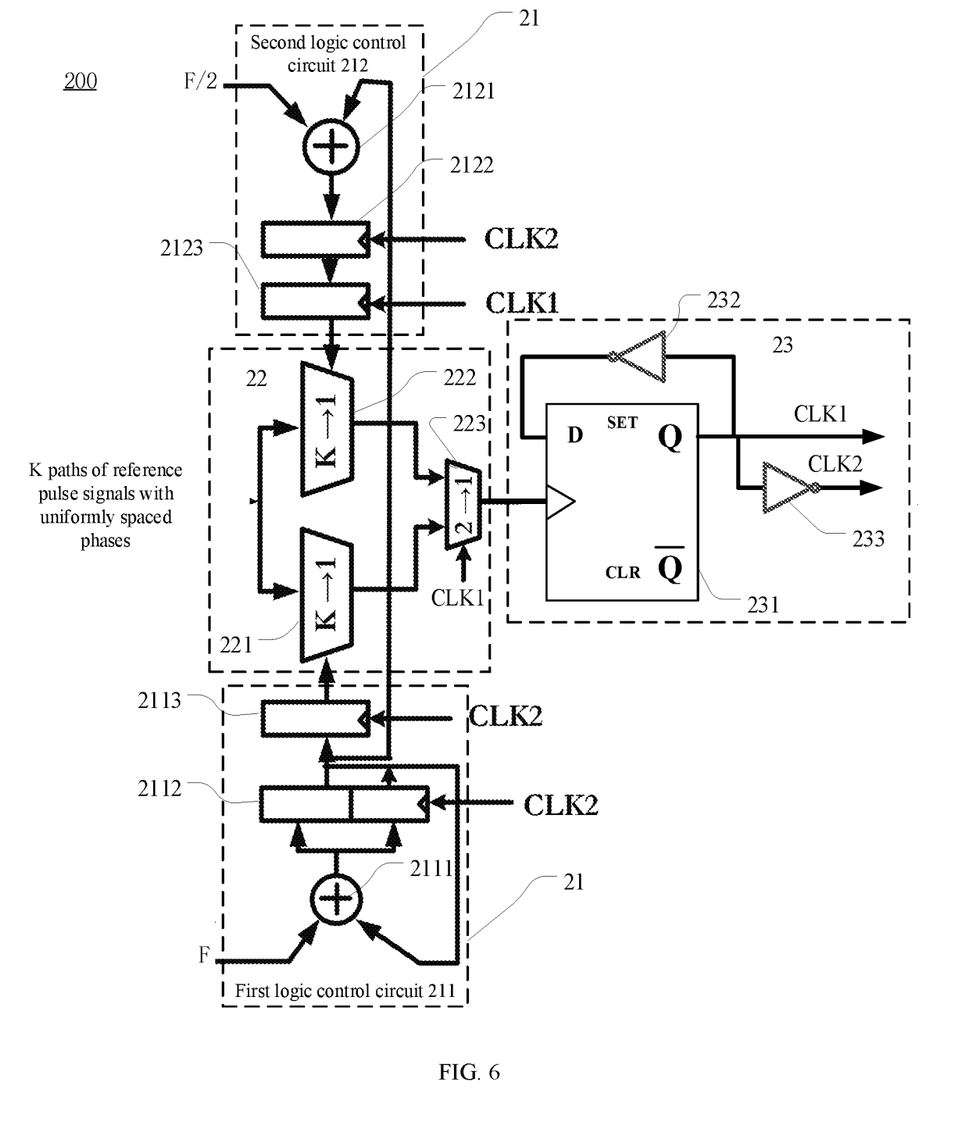
FIG. 6 is a schematic structural diagram of a frequency synthesizer according to an embodiment of the present disclosure.

FIG. 6 is a schematic structural diagram of a frequency synthesizer according to the present disclosure. Referring to FIG. 6, the frequency synthesizer may include a first processing unit 21, a second processing unit 22, and an output unit 23.

The first processing unit 21 is connected to a control circuit 10, and configured to generate a first control signal and a second control signal based on a control word. The second processing unit 22 is connected to the first processing unit 21, configured to select, based on the first control signal, a first pulse signal from reference pulse signals with uniformly spaced phases, select, based on the second control signal, a second pulse signal from the reference pulse signals, and select one of the first pulse signal and the second pulse signal as an output signal.

The output unit 23 is connected to the second processing unit 22, and generates the pulse signal based on the output signal of the second processing unit 22.

The detailed operating processes of the first processing unit 21, the second processing unit 22, and the output unit 23 are described hereafter with reference to FIG. 6:

The first processing unit 21 includes a first logic control circuit 211 and a second logic control circuit 212.

Referring to FIG. 6, the first logic control circuit 211 includes a first adder 2111, a first register 2112, and a second register 2113. The first register 2112 is connected to the first adder 2111 and the second register 2113. The first logic control circuit 211 is configured to generate the first control signal.

The first adder 2111 is configured to add a control word F to most significant bit (for example, 5 bits) stored in the first register 2112, and then stores an addition result in the first register 2112 at a rising edge of a second clock signal CLK2. Alternatively, the first adder 2111 may add the control word F to all bits stored in the first register 2112, and then store an addition result in the first register 2112 at the rising edge of the second clock signal CLK2. At a next rising edge of the second clock signal CLK2, the most significant bit stored in the first register 2112 are stored in the second register 2113 as a selection signal of a first K→1 multiplexer 221. That is, the first control signal is configured to select a path of signal from the K paths of reference pulse signals with uniformly spaced phases as the first pulse signal.

In the case that the control word F are added to and the most significant bit stored in the first register 2112, it is assumed that the value in the first register 2112 is less than 1, in this case, the most significant bit stored in the second register 2113 are I+1 upon carry of the fractional part of the addition result, and the most significant bit stored in the second register 2113 are I upon no carry of the control word. In the case that the value in the second register 2113 is I+1, the corresponding output of the frequency synthesizer is $T_B$=(I+1)Δ. In the case that the value in the second register 2113 is I, the corresponding output of the frequency synthesizer is $T_A$=IΔ. It can be seen that whether $T_A$ or $T_B$ is output is related to the fractional part of the control word. The smaller the fractional part of the control word is, the less prone to carry, the greater the probability of outputting $T_A$ is; and conversely, the greater the probability of outputting $T_B$ is.

The first register 2112 may include a first portion storing an integer, and a second portion storing a decimal. During addition, the integer part of the control word F is added to the content in the first portion, and the fractional part of the control word F is added to the content in the second portion. The addition is binary addition, and is realized by an adder.

The second logic control circuit 212 includes a second adder 2121, a third register 2122, and a fourth register 2123. The third register 2122 is connected to the second adder 2121 and the fourth register 2123. The second logic control circuit 212 is configured to generate the second control signal.

The second adder 2121 adds half of the control word F/2 to the most significant bit stored in the first register 2112, and then stores an addition result in the third register 2122 at a rising edge of the second clock signal CLK2. In the case that the addition result is stored in the third register 2122, at a rising edge of a first clock signal CLK1, the information stored in the third register 2122 is stored in the fourth register 2123 as a selection signal of a second K→1 multiplexer 222. That is, the second control signal is configured to select a path of signal from the K reference pulse signals as the second pulse signal. The second clock signal CLK2 is a signal obtained in response to the first clock signal CLK1 passing through a NOT gate.

Referring to FIG. 6, the second processing unit 22 includes the first K→1 multiplexer 221, the second K→1 multiplexer 222, and a 2→1 multiplexer 223. Each of the first K→1 multiplexer 221 and the second K→1 multiplexer 222 includes a plurality of input terminals, a control input terminal, and an output terminal. The 2→1 multiplexer 223 includes a control input terminal, an output terminal, a first input terminal, and a second input terminal. The output terminal of the first K→1 multiplexer 221 is connected to the first input terminal of the 2→1 multiplexer 223, and the output terminal of the second K→1 multiplexer 222 is connected to the second input terminal of the 2→1 multiplexer 223. The plurality of input terminals of each of the first K→1 multiplexer 221 and the second K→1 multiplexer 222 are connected to the signal generator. The control input terminal of the first K→1 multiplexer 221 is connected to the second register 2113, and the control input terminal of the second K→1 multiplexer 222 is connected to the fourth register 2123.

Under the control of the first control signal generated by the first logic control circuit 211, the control input terminal of the first K→1 multiplexer 221 selects a signal from the K paths of reference pulse signals with uniformly spaced phases as the output signal, namely, the first pulse signal. Under the control of the second control signal generated by the second logic control circuit 212, the control input terminal of the second K→1 multiplexer 222 selects a path of signal from the K paths of reference pulse signals with uniformly spaced phases as the output signal, namely, the second pulse signal.

The first K→1 multiplexer is taken as an example. The output signal may be selected based on the value stored in the second register 2113, namely, the value of the first control signal. For example, in the case that the first control signal is 3, a third signal of the K paths of reference pulse signals with uniformly spaced phases is selected as the output signal.

At the rising edge of the first clock signal CLK1, the 2→1 multiplexer 223 may select one of the first pulse signal output by the first K→1 multiplexer 221, and the second pulse signal output by the second K→1 multiplexer 222 as the output signal of the 2→1 multiplexer 223. For example, the first pulse signal may initially be selected at a first rising edge until a second rising edge, the second pulse signal may initially be selected at a second rising edge until a third rising edge, and so on.

The 2→1 multiplexer makes a selection from the outputs of the two K→1 multiplexers, the outputs of the two K→1 multiplexers are combined into a new period. The difference between the first pulse signal and the second pulse signal output by the two K→1 multiplexers is an integer number of $\Delta$, and the difference may be of two values I$\Delta$ and (I+1)$\Delta$. Therefore, the pulse signals finally output by the frequency synthesizer have two different periods $T_A$ and $T_B$.

Referring to FIG. 6, the output unit 23 includes a trigger circuit configured to generate a pulse train. The trigger circuit includes a D flip-flop 231, a first inverter 232, and a second inverter 233. The D flip-flop 231 includes a data input terminal, a clock input terminal, and an output terminal. The first inverter 232 includes an input terminal and an output terminal. The second inverter 233 includes an input terminal and an output terminal. The clock input terminal of the D flip-flop 231 is connected to the 2→1 multiplexer 223. The data input terminal of the D flip-flop 231 is connected to the output terminal of the first inverter 232. The output terminal of the D flip-flop 231 is connected to the input terminal of the first inverter 232 and the input terminal of the second inverter 233. The output terminal of the D flip-flop 231 or the output terminal of the second inverter 233 may serve as an output terminal of the frequency synthesizer, namely, a terminal generating the pulse signal. Therefore, the pulse signal output by the frequency synthesizer is the first clock signal CLK1 or the second clock signal CLK2 in FIG. 6.

The clock input terminal of the D flip-flop 231 is configured to receive the output from the output terminal of the 2→1 multiplexer 223, and output the first clock signal CLK1 by the output terminal. The input terminal of the first inverter 232 is configured to receive the first clock signal CLK1, and output an output signal to the data input terminal of the D flip-flop 231. The input terminal of the second inverter 233 is configured to receive the first clock signal CLK1, and output the second clock signal CLK2 by the output terminal.

Figure 7:
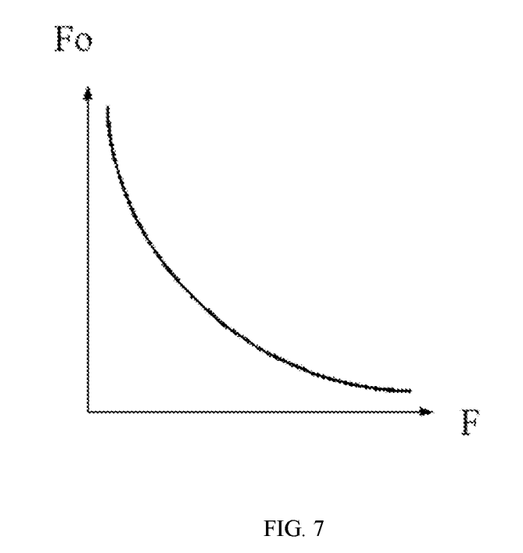
FIG. 7 is a schematic diagram of a relationship between a frequency Fo of a pulse signal and a control word F according to an embodiment of the present disclosure.

As shown in FIG. 7, a relationship between a frequency Fo of the pulse signal output by the frequency synthesizer, and the control word F is Fo=1/(F×$\Delta$). It can be seen that in the case that the phase difference $\Delta$ is constant, the frequency Fo is inversely proportional to the control word F. That is, the greater the control word is, the lower the frequency is.

The frequency synthesizer has a plurality of multiplexers inside, such as the first K→1 multiplexer 221, the second K→1 multiplexer 222, and the 2→1 multiplexer 223 described as above. Different time is taken to transmit the same signal via different paths in a same multiplexer, which is one of main reasons for jitters of the circuit. Two frequency synthesizers are connected in parallel, and are input a same signal. In this way, a difference is present between the moments when the signal arrives at the output circuit. The difference is extracted and encoded as 1 or 0, such that an identifier (ID) consisting of a series of binary bits, namely, a digital fingerprint, is obtained. The digital fingerprint is generated upon power-up every time, and is not changed without changing parameters. In an upper-layer application, authorization, authentication, encryption, decryption, and the like can be completed by using the digital fingerprint.

Deviations in performance and design of a circuit in the digital fingerprint generator according to the present disclosure are described hereafter. The main deviations in the fingerprint generator are as follows, and each of deviations results in a change in the waveform of the pulse signal. Finally, these deviations jointly have an impact on the digital fingerprint output by the digital fingerprint generator:

1. A deviation $\varepsilon_1$, between the waveform of each of the output K paths of reference pulse signals with uniformly spaced phases and an ideal waveform, is caused by a deviation generated by the circuit layout and wiring of the signal generator.
2. The signal generator transmits the K paths of signals to the first pulse generation circuit 20 and the second pulse generation circuit 30. A deviation $\varepsilon_2$, between the signals transmitted to the first pulse generation circuit 20 and the signals transmitted to the second pulse generation circuit 30, is caused by a transmission wiring deviation.

3. In the case that the K paths of signals arrive at the first pulse generation circuit 20 and the second pulse generation circuit 30, the corresponding pulse signals are finally output upon being processed inside the first pulse generation circuit 20 and the second pulse generation circuit 30. A deviation $\varepsilon_3$, between the pulse signals output by the first pulse generation circuit 20 and the second pulse generation circuit 30, is caused by deviations of layout and wiring of the first pulse generation circuit 20 and the second pulse generation circuit 30.

4. The first pulse generation circuit 20 and the second pulse generation circuit 30 transmit the pulse signals to the output circuit 40. A deviation $\varepsilon_4$, between the moments when the pulse signals output by the first pulse generation circuit 20 and the second pulse generation circuit 30 arrive at the output circuit 40, is caused by a transmission wiring deviation.

It should be noted that, the deviations described above may be changed due to drastic changes in the environment. Therefore, the digital fingerprint generator may further include a protection device. The circuit structure of the digital fingerprint generator may be disposed within the protection device, so as to avoid impact of environmental factors on the circuit, and ensure stability of the output digital fingerprint. For example, temperature, voltage, and humidity are constant inside the protection device. In addition, the deviations described above may change as lines age. Therefore, an aging period needs to be considered in the case that the digital fingerprint generator is designed and manufactured, so as to ensure that a service life of the digital fingerprint generator is long enough, and deviations caused by aging in the service life have no impact on the output of the digital fingerprint generator. As a result, the stability of the output digital fingerprint is ensured.

In addition to the deviation $\varepsilon_1$ inside the signal generator (the two frequency synthesizers use the same signal generator, the deviation has the same impact on the two frequency synthesizers; and the deviation $\varepsilon_1$ is eliminated upon determining the sequence the rising edges of the pulse signals output by the two frequency synthesizers), the other deviations also have an impact on the generation of the digital fingerprint. Therefore, $\varepsilon_2$, $\varepsilon_3$ and $\varepsilon_4$ may be defined as a parameter $\varepsilon$. Only this parameter is configured to represent the deviation between the two paths corresponding to the first pulse generation circuit 20 and the second pulse generation circuit 30.

It is assumed that, a moment when a $x^{th}$ path of signal, of the K paths of reference pulse signals with uniformly spaced phases, arrives at the 2→1 multiplexer in the frequency synthesizer of the first pulse generation circuit 20 is $\varepsilon_x$, and a moment when a mod $(x+nF, K)^{th}$ path of signal, of the K paths of reference pulse signals with uniformly spaced phases, arrives at the 2→1 multiplexer in the frequency synthesizer of the first pulse generation circuit 20 is $\varepsilon_{x+nF}$. A moment when the $x^{th}$ path of signal, of the K paths of reference pulse signals with uniformly spaced phases, arrives at the 2→1 multiplexer in the frequency synthesizer of the second pulse generation circuit 30 is $\varepsilon'_x$, and a moment when the mod$(x+nF, K)^{th}$ path of signal, of the K paths of reference pulse signals with uniformly spaced phases, arrives at the 2→1 multiplexer in the frequency synthesizer of the second pulse generation circuit 30 is $\varepsilon'_{x+nF}$. The $x^{th}$ and mod$(x+nF, K)^{th}$ paths of signals are the two pulse signals selected from signals in two successive periods by the K→1 multiplexer in the frequency synthesizer. The mod$(x+nF, K)^{th}$ path indicates the number of paths of the selected pulse signals after the most significant bit x stored in the first register is successively superposed with the control word F in n periods (the value in the first register is accumulated with the control word F in each period).

In this case, the period of the pulse signal output by the first pulse generation circuit 20 may be expressed as follows:

$$T_1 = \varepsilon_{x+F} - \varepsilon_x \quad (2)$$

The period of the pulse signal output by the second pulse generation circuit 30 may be expressed as follows:

$$T_2 = \varepsilon'_{x+F} - \varepsilon'_x \quad (3)$$

It can be seen from the formulas (2) and (3) that a difference between $T_1$ and $T_2$ is caused by the deviations between the first pulse generation circuit 20 and the second pulse generation circuit 30, and the difference may be different in different periods. For example, in some periods, the rising edge of the first pulse signal may be ahead of or behind the rising edge of the second pulse signal. A sequence relationship, between the rising edges of the first pulse signal and the second pulse signal in each period, is converted into a bit for output, such that the deviation described above is encoded. As a result, the digital fingerprint is obtained.

To encode the deviations described as above, the output circuit 40 includes a D flip-flop 400. A data input terminal D of the D flip-flop 400 is connected to the first pulse generation circuit 20, and a clock input terminal CLK of the D flip-flop 400 is connected to the second pulse generation circuit 30.

The D flip-flop 400 is configured to output the digital fingerprint based on the sequence of the rising edges of the first pulse signal and the second pulse signal.

The operating principle of the D flip-flop 400 is as follows: upon the occurrence of the rising edge of the CLK signal, the data of D is stored into a port Q, such that the circuit is an ideal time comparator. A bit 0 is generated in the case that the CLK signal (first pulse signal) is ahead of the D signal (second pulse signal), and a bit 1 is generated in the case that the CLK signal is behind the D signal.

In other words, in the case that $\Delta T = T_2 - T_1 \geq 0$, the output circuit 40 outputs bm=1.

In the case that $\Delta T = T_2 - T_1 < /0$, the output circuit 40 outputs bm=0.

$$\Delta T = T_2 - T_1 = (\varepsilon'_{x+F} - \varepsilon'_x) - (\varepsilon_{x+F} - \varepsilon_x) = (\varepsilon'_{x+F} - \varepsilon_{x+F}) - (\varepsilon'_x - \varepsilon_x) \quad (4)$$

$\varepsilon_x$, $\varepsilon'_x$, $\varepsilon_{x+F}$, $\varepsilon'_{x+F}$ mainly depend on the layouts of the first pulse generation circuit 20 and the second pulse generation circuit 30. When designing the circuit, the two circuits are designed to have a same structure, such that errors are mainly process errors. In this way, randomness and unpredictability are introduced.

A value of $\Delta T$ is used as a feature bit. In the case that K and F are determined, the digital fingerprint generator can generate $\Omega \times K$ feature bits.

A first value of $\Delta T$ is as follows, and bm output by the output circuit 40 is 1 bit.

$$\Delta T = (\varepsilon'_{x+F} - \varepsilon_{x+F}) - (\varepsilon'_x - \varepsilon_x) = \delta_1 \quad (5)$$

A second value of $\Delta T$ is as follows, and bm output by the output circuit 40 is 2 bit.

$$\Delta T = [(\varepsilon'_{x+2F} - \varepsilon_{x+2F}) - (\varepsilon'_{x+F} - \varepsilon_{x+F})] + [(\varepsilon'_{x+F} - \varepsilon_{x+F}) - (\varepsilon'_x - \varepsilon_x)] = \delta_2 + \delta_1 \quad (6)$$

In the case that n<Ω, the $n^{th}$ value of ΔT is as follows, and bm output by the output circuit 40 is n bit.

$$\Delta T = [(\varepsilon'_{x+nF} - \varepsilon_{x+nF}) - (\varepsilon'_{x+(n-1)F} - \varepsilon_{x+(n-1)F})] + \ldots + [(\varepsilon'_{x+F} - \varepsilon_{x+F}) - (\varepsilon'_x - \varepsilon_x)] = \delta_n + \delta_{n-1} + \ldots + \delta_2 + \delta_1 \quad (7)$$

In the case that n=Ω, the $n^{th}$ value of ΔT is as follows, and bm output by the output circuit 40 is Ω bit.

$$\Delta T = [(\varepsilon'_{x+\Omega F} - \varepsilon_{x+\Omega F}) - (\varepsilon'_{x+(\Omega-1)F} - \varepsilon_{x+(\Omega-1)F})] + \ldots + [(\varepsilon'_{x+F} - \varepsilon_{x+F}) - (\varepsilon'_x - \varepsilon_x)] = \delta_\Omega + \delta_{\Omega-1} + \ldots + \delta_2 + \delta_1 \quad (8)$$

Until now, a new deviation is introduced to ΔT each time, and the deviations are independent from each other, and have no necessary relationship.

In the case that n>Ω, the $n^{th}$ value of ΔT is as follows, and bm output by the output circuit 40 is n bit.

$$\Delta T = [(\varepsilon'_{x+nF} - \varepsilon_{x+nF}) - (\varepsilon'_{x+(n-1)F} - \varepsilon_{x+(n-1)F})] + [(\varepsilon'_{x+(n-1)F} - \varepsilon_{x+(n-1)F}) - (\varepsilon'_{x+(n-2)F} - \varepsilon_{x+(n-2)F})] + \ldots + [(\varepsilon'_{x+\Omega F} - \varepsilon_{x+\Omega F}) - (\varepsilon'_{x+(\Omega-1)F} - \varepsilon_{x+(\Omega-1)F})] \ldots + [(\varepsilon'_{x+F} - \varepsilon_{x+F}) - (\varepsilon'_x - \varepsilon_x)] = \delta_n + \delta_{n-1} + \ldots + \delta_\Omega + \delta_{\Omega-1} \ldots + \delta_2 + \delta_1 \quad (9)$$

The two K→1 multiplexers in the frequency synthesizer repeatedly select the previously selected waveform after Ω periods, and the relationship is as follows:

$$\delta_{\Omega+1} = \delta_1$$
$$\delta_{\Omega+2} = \delta_2$$
$$\vdots$$
$$\delta_n = \delta_{(n \bmod \Omega)} \quad (10)$$

After Ω periods, a new deviation cannot be introduced, such that the unpredictability of the circuit is decreased. Therefore, the data generated after Ω periods may be deleted, and only the data generated in Ω periods are retained.

Ω may be calculated by the following formula:

$$\Omega = \frac{K}{gcd(F, K)} \quad (11)$$

wherein K represents a number of paths of the reference pulse signals, which is equal to a maximum storage value of the first register, F represents the control word, and gcd represents a greatest common divisor.

For example, K=16, F=4, and the first register is a 4-bit register. That is, the maximum storage value is 16. In this case, the value in the register are increased by F (4) per period, and thereby the value in the register after 4 periods is the same as the initial value. That is, Ω herein is 4.

Exemplarily, the control circuit 10 is further connected to the output circuit 40.

The control circuit 10 is configured to acquire the digital fingerprint output by the output circuit 40, and simplifies the digital fingerprint by extracting data in one period in the digital fingerprint, and deleting data in the other periods, and the periods are determined based on a number of paths of the reference pulse signals, and the control word.

Figure 8:
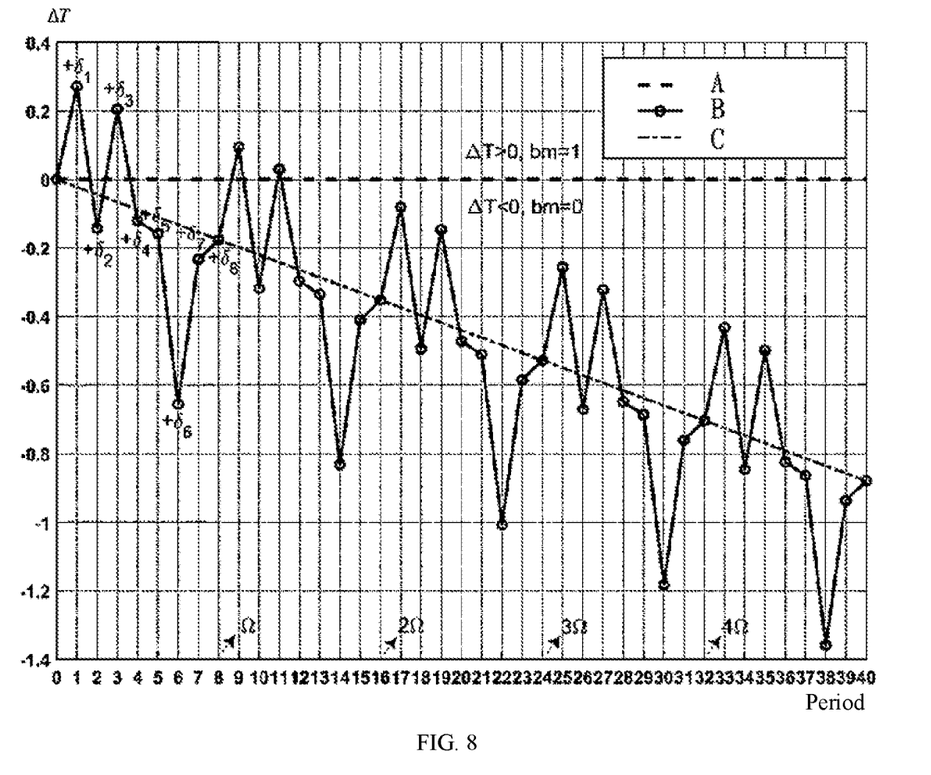
FIG. 8 is a schematic diagram of a distribution of feature bits according to an embodiment of the present disclosure.

FIG. 8 is a schematic diagram of a distribution of feature bits. As shown in FIG. 8, the abscissa is period (0 to 40), and the ordinate is ΔT. In this figure, Ω=8. It can be seen that the deviations are repeated every 8 periods. The line A in the figure is a threshold line. That is, ΔT is greater than 0 above the line, and less than 0 below the line, and the values finally output by the corresponding output circuits are different. B in the figure represents the value of ΔT corresponding to each period. The line C represents the change trend of ΔT.

The deviation increments may repeat periodically, for example, the deviation increments for periods 0 to 8 are the same as the corresponding deviation increments for periods 9 to 16. However, in periods 0 to 40, the overall trend is diagonal due to the cumulative effect of the deviations. For example, the periods 0 to 8 are not completely the same as the periods 9 to 16.

In the process of generating a digital fingerprint, the digital fingerprint may be affected by the initial phase of the reference pulse signal selected by the frequency synthesizer.

In the case that the control word F is determined, it is assumed that the initial phases of the reference pulse signals selected by the K→1 multiplexer in both cases are i and j respectively, and thereby the relationships are as follows:

$$\Delta T_i = T_2 - T_1 = (\varepsilon'_{i+F} - \varepsilon_{i+F}) - (\varepsilon'_i - \varepsilon_i) = \delta_i$$

$$\Delta T_j = T_2 - T_1 = (\varepsilon'_{j+F} - \varepsilon_{j+F}) - (\varepsilon'_j - \varepsilon_j) = \delta_j$$

$$\Delta T_i - \Delta T_j = \delta_i - \delta_j = [(\varepsilon'_{i+F} - \varepsilon_{i+F}) - (\varepsilon'_i - \varepsilon_i)] - [(\varepsilon'_{j+F} - \varepsilon_{j+F}) - (\varepsilon'_j - \varepsilon_j)] = (\varepsilon'_{i+F} - \varepsilon'_{j+F}) + (\varepsilon_{j+F} - \varepsilon_{i+F}) + (\varepsilon'_j - \varepsilon'_i) + (\varepsilon_i - \varepsilon_j) \quad (12)$$

Different initial phases result in different deviations. As a result, $\Delta T_i - \Delta T_j$ is not equal to 0. In the case that different initial phases are selected, different values of ΔT are obtained, and thereby different data bits are output. In this way, different digital fingerprints are obtained.

Figure 9:
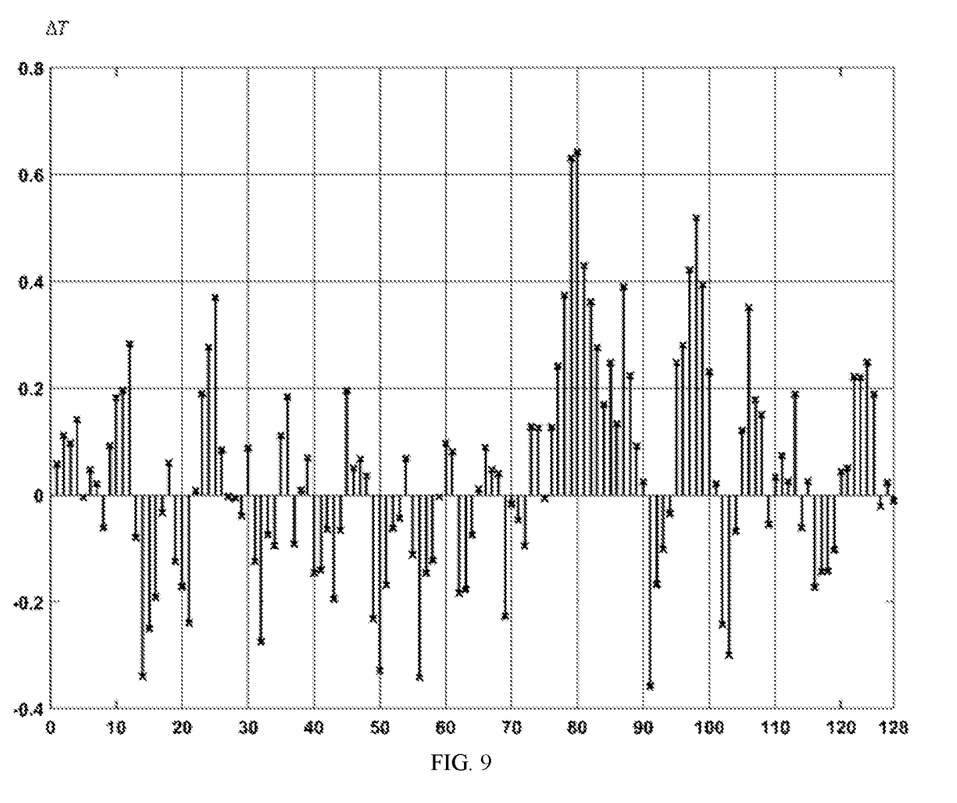
FIG. 9 is a diagram of a relationship between an initial phase and a feature bit according to an embodiment of the present disclosure.

FIG. 9 is a diagram of a relationship between an initial phase and a feature bit. Referring to FIG. 9, K=128. The axis of abscissa represents a number of paths of the reference pulse signals. The initial phases of different reference pulse signals are different. The axis of ordinate represents ΔT. Different values of ΔT are obtained in the case that reference pulse signals with different initial phases are selected for frequency synthesis, by the frequency synthesizer during operating. It can be seen from FIG. 9 that there is no relationship between the values of ΔT. In the case that the control word is determined, the number of options for the initial phases is K, and the number of feature bits is Ω, a total feature bit is obtained by combining the initial phases and the feature bits.

The total feature is as follows:

$$FB = \Omega \times K \quad (13)$$

Referring to FIG. 2, the signal generator 50 is further connected to the control circuit 10.

The control circuit 10 is configured to send an initial phase control instruction to the signal generator 50. The initial phase control instruction is configured to control an initial phase of a reference pulse signal generated by the signal generator 50. Different digital fingerprints are output in the case that the initial phases of the reference pulse signals are different.

0 to K−1 paths of pulses shown in FIG. 4 are taken as an example. The signal generator 50 has 1 to K output ports. In the case that pulses are generated by the signal generator 50, the $0^{th}$ path of pulse may be output via the output port 1, the $1^{st}$ path of pulse may be output via the output port 2, and so on. Alternatively, the $0^{th}$ path of pulse may be output via the output port 2, the $1^{st}$ path of pulse may be output via the output port 3, and so on. Different output manners described above correspond to different initial phases. The initial phases are referred to as the initial phases of the pulses output by different output ports of the signal generator 50. Connection relationships between different output ports and the frequency synthesizer are constant (the K paths of signals may be transmitted via K lines), such that the output digital fingerprint may be changed by changing the initial phases.

In an embodiment of the present disclosure, the control circuit 10 may be further configured to receive the first control signal, and update at least one of the output control word and the initial phase control instruction in response to the first control signal.

Exemplarily, the control circuit 10 may further be connected to a processor, a host computer, or another terminal. The component or device that is connected to the control circuit 10 may control the digital fingerprint generator to change the output digital fingerprint. For example, the control circuit 10 is configured to receive the first control signal sent by the processor, host computer, or another terminal, and update at least one of the output control word and the initial phase control instruction in response to the first control signal.

In addition to the initial phase and the control word, the control circuit 10 may further control the frequency of the reference pulse signal. The digital fingerprint generator has four states: idle (IDLE), waiting for configuration, phase reset (PHRST), and fingerprint generation.

In the idle state, the digital fingerprint generator does not perform any operation, and waits for an enable signal; and the digital fingerprint generator enters the waiting for configuration state upon obtaining the enable signal.

In the waiting for configuration state, the frequency synthesizer starts to operate, and waits for the configuration of the control word F; correspondingly, in the case of obtaining the enable signal, the control circuit 10 generates the control word F for the frequency synthesizer to complete the configuration. In this way, and the digital fingerprint generator enters the phase reset state. In the waiting for configuration state, in the case that the configuration is not completed for a long time, the digital fingerprint generator returns to the idle state.

In the phase reset state, the initial phase of the reference pulse signal output by the signal generator is configured by the control circuit 10. The digital fingerprint generator enters the fingerprint generation state upon resetting of the phase. Phase reset is referred to as resetting the phase to an initial phase of a specific fingerprint (a specific one of a plurality of digital fingerprints) to be output; or to an initial phase different from the previous initial phase, to change the output digital fingerprint.

In the fingerprint generation state, the digital fingerprint is generated by the digital fingerprint.

In the fingerprint generation state, the control circuit 10 may further receive the first control signal from the processor, host computer, or another terminal. The digital fingerprint generator switches from the fingerprint generation state back to the WAITC state based on the first control signal. In this case, the control circuit 10 switches at least one of the INV or the control word F, to change the generated digital fingerprint.

Figure 10:
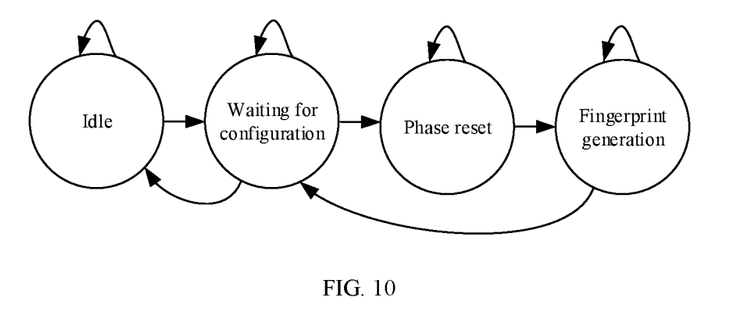
FIG. 10 is a schematic diagram of status transition of a digital fingerprint generator according to an embodiment of the present disclosure.

Transition relationships between the states described above of the digital fingerprint generator may be shown in FIG. 10.

The digital fingerprint generator may generate a total of $\Omega \times K$ feature bits and a total of K digital fingerprints.

Optionally, the output circuit 40 outputs a 0/1 bit sequence based on a sequence of the rising edges of the first pulse signal and the second pulse signal; or outputs a 0/1 bit sequence based on the sequence of the falling edges of the first pulse signal and the second pulse signal. The 0/1 bit sequence is converted into a quick response (QR) code.

For example, the bit 0 is converted into a white dot, and the bit 1 is converted into a black dot. A fixed-size rectangle of is obtained by arranging the dots according to the order of the bit sequence, such that a QR code is obtained. For example, the dots are arranged into an M×N rectangle, wherein M represents a number of black and white dots in each row, and N represents a number of black and white dots in each column. The QR code is used as the digital fingerprint.

Figure 11:
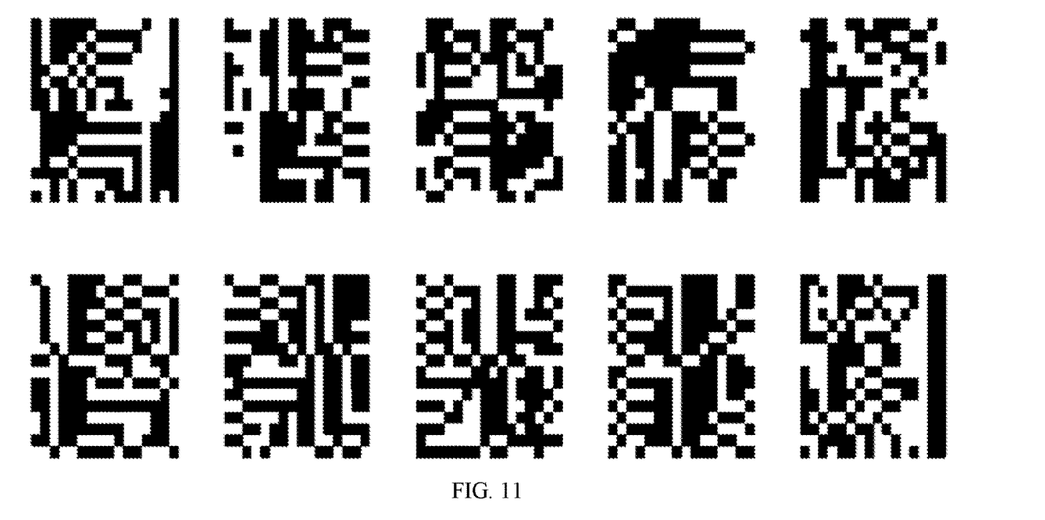
FIG. 11 is a schematic diagram of digital fingerprints according to an embodiment of the present disclosure.

FIG. 11 shows the digital fingerprints generated by the fingerprint generator. As shown in FIG. 11, ten digital fingerprints generated in the case that K=32, F=4, and $\Omega$=8, and the above digital fingerprints are merely some of the digital fingerprints generated in this scenario. Each of the digital fingerprints has a specific pattern. A corresponding circuit or chip may be determined based on the pattern of the respective digital fingerprint, such that authentication is completed.

A solution for generating a digital fingerprint based on a physical non-clone function of a frequency synthesize is provided by the present disclosure. The solution has features of high efficiency, low power consumption, low costs, and high reliability. The digital fingerprint generator may be integrated in various chips, and may be applicable in fields such as fingerprint identification, cryptography, security protection, and encryption, to provide a unique digital fingerprint for each independent chip in the Internet of Things era.

Figure 12:
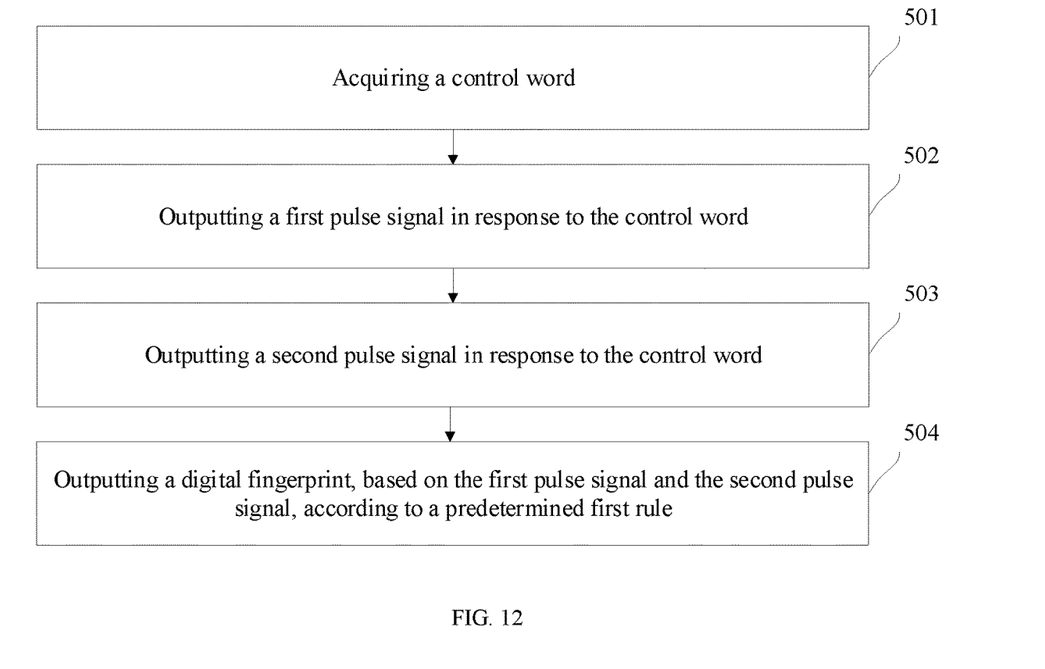
FIG. 12 is a flowchart of a method for generating a digital fingerprint according to an embodiment of the present disclosure.

FIG. 12 is a flowchart of a method for generating a digital fingerprint according to an embodiment of the present disclosure. Referring to FIG. 12, the method includes:

In process 501, a control word is obtained.

This process may be performed by the control circuit in FIG. 1.

In process 502, a first pulse signal is output in response to the control word.

This process may be performed by the first pulse generation circuit in FIG. 1.

In process 503, a second pulse signal is output in response to the control word. The first pulse signal and the second pulse signal are generated by circuits with a same structure. Each of the first pulse signal and the second pulse signal include a first frequency signal and a second frequency signal. Probabilities of occurrence of the first frequency signal and the second frequency signal are controlled by the control word.

This process may be performed by the second pulse generation circuit in FIG. 1.

Optionally, the first pulse signal is output in response to the control word may include:

The first pulse signal is generated in response to reference pulse signals with uniformly spaced phases and the control word.

The control word includes a first coefficient and a second coefficient.

The first pulse signal includes the first frequency signal generated based on the reference pulse signals and the first coefficient, and the second frequency signal generated based on the reference pulse signals and the first coefficient, wherein a ratio of the first frequency signal to the second frequency signal in the first pulse signal is controlled by the second coefficient.

Optionally, the first pulse signal is generated in response to the reference pulse signals with uniformly spaced phases and the control word includes:

A first control signal and a second control signal are generated based on the control word.

The first pulse signal is selected from the reference pulse signals with uniformly spaced phases based on the first control signal, the second pulse signal is selected from the reference pulse signals based on the second control signal, and one of the first pulse signal and the second pulse signal is selected as an output signal.

The first pulse signal is generated based on the output signal.

Exemplarily, the pulse signal is generated according to the following formula: $T_{TAF}=(1-r)\times T_A+r\times T_B$, $T_A=I\times\Delta$, $T_B=(I+1)\times\Delta$, $T_{TAF}=(1-r)\times I\times\Delta+r\times(I+1)\times\Delta=(I+r)\times\Delta$, and the control word F=I+r.

$T_{TAF}$ represents a period of the pulse signal. $T_A$ represents the first frequency signal (also referred to as a first periodic signal). $T_B$ represents the second frequency signal (also referred to as a second periodic signal). I represents the first coefficient described above, configured to select signals from the K reference pulse signals to synthesize a frequency signal. For example, in the case that the control word I is 3, in a period, two reference pulse signals with a phase difference of $3\Delta$ are selected from the K reference pulse signals to synthesize and output $T_A=3\Delta$; in a next period, two reference pulse signals with a phase difference of $4\Delta$ are selected to synthesize and output $T_B=4\Delta$. $\Delta$ is a phase difference between any two adjacent signals of the K reference pulse signals with uniformly spaced phases. r represents the second coefficient described above, configured to control the probabilities of occurrence of the first frequency signal and the second frequency signal. r controls the probability of occurrence of $T_B$, and 1−r controls the probability of occurrence of $T_A$.

In process 504, a digital fingerprint is output, based on the first pulse signal and the second pulse signal, according to a predetermined first rule.

Exemplarily, a first rule includes: outputting the digital fingerprint based on a sequence of rising edges of the first pulse signal and the second pulse signal; or outputting the digital fingerprint based on a sequence of falling edges of the first pulse signal and the second pulse signal.

This process may be performed by the output circuit in FIG. 1.

Optionally, the method may further include:

The first control signal is received.

At least one of the control word and an initial phase control instruction is updated in response to the first control signal, wherein the initial phase control instruction is configured to control initial phases of the reference pulse signals, and different digital fingerprints are output in the case that the initial phases of the reference pulse signals are different.

Optionally, the method may further include:

The output digital fingerprint is acquired and simplified by extracting data, in one period, of the digital fingerprint and deleting data in the other periods, wherein the periods are determined based on a number of the reference pulse signals, and the control word.

The above descriptions are merely exemplary embodiments of the present disclosure, and are not intended to limit the present disclosure. Any modification, equivalent replacement, and improvement within the spirit and principle of the present disclosure shall be included within the protection scope defined by the appended claims of the present disclosure.

What is claimed is:

1. A digital fingerprint generator, comprising:
    a control circuit, configured to generate a control word;
    a first pulse generation circuit, connected to the control circuit, and configured to output a first pulse signal in response to the control word;
    a second pulse generation circuit, connected to the control circuit, having a same structure as the first pulse generation circuit, and configured to output a second pulse signal in response to the control word, wherein each of the first pulse signal and the second pulse signal comprises a first frequency signal and a second frequency signal, probabilities of occurrence of the first frequency signal and the second frequency signal being controlled by the control word; and
    an output circuit, connected to the first pulse generation circuit and the second pulse generation circuit, and configured to output a digital fingerprint based on the first pulse signal and the second pulse signal according to a predetermined first rule;
    wherein the first pulse generation circuit comprises:
    a frequency synthesizer, connected to the control circuit and the output circuit, and configured to generate the first pulse signal in response to reference pulse signals with uniformly spaced phases, and the control word; wherein
    the control word comprises a first coefficient and a second coefficient; and
    the first pulse signal comprises the first frequency signal generated based on the reference pulse signals and the first coefficient, and the second frequency signal generated based on the reference pulse signals and the first coefficient, wherein a ratio of the first frequency signal to the second frequency signal in the first pulse signal is controlled by the second coefficient.

2. The digital fingerprint generator according to claim 1, wherein the first rule comprises:
    outputting the digital fingerprint based on a sequence of rising edges of the first pulse signal and the second pulse signal.

3. The digital fingerprint generator according to claim 2, wherein the output circuit comprises a D flip-flop;
    wherein a data input terminal of the D flip-flop is connected to the first pulse generation circuit, and a clock input terminal of the D flip-flop is connected to the second pulse generation circuit; and
    the D flip-flop is configured to output the digital fingerprint based on the sequence of the rising edges of the first pulse signal and the second pulse signal.

4. The digital fingerprint generator according to claim 1, further comprising:
    a signal generator, connected to the first pulse generation circuit and the second pulse generation circuit, and configured to generate a plurality of reference pulse signals with uniformly spaced phases.

5. The digital fingerprint generator according to claim 4, wherein
    the signal generator is further connected to the control circuit; and
    the control circuit is configured to send an initial phase control instruction to the signal generator, the initial phase control instruction being configured to control initial phases of the reference pulse signals generated by the signal generator, wherein different digital fingerprints are output in the case that the initial phases of the reference pulse signals are different.

6. The digital fingerprint generator according to claim 5, wherein the control circuit is configured to receive a first control signal, and update at least one of the output control word and the initial phase control instruction in response to the first control signal.

7. The digital fingerprint generator according to claim 6, wherein
the control circuit is further connected to the output circuit; and
the control circuit is configured to acquire the digital fingerprint output by the output circuit, and simplify the digital fingerprint by extracting data, in one of periods, of the digital fingerprint and deleting data in the other periods, wherein the periods are determined based on a number of paths of the reference pulse signals, and the control word.

8. A method for generating a digital fingerprint, comprising:
acquiring a control word;
outputting a first pulse signal in response to the control word:
outputting a second pulse signal in response to the control word, wherein the first pulse signal and the second pulse signal are generated by circuits with a same structure, each of the first pulse signal and the second pulse signal comprises a first frequency signal and a second frequency signal, and probabilities of occurrence of the first frequency signal and the second frequency signal are controlled by the control word; and
outputting a digital fingerprint, based on the first pulse signal and the second pulse signal, according to a predetermined first rule;
wherein outputting the first pulse signal in response to the control word comprises:
generating the first pulse signal in response to reference pulse signals with uniformly spaced phases, and the control word; wherein
the control word comprises a first coefficient and a second coefficient; and
the first pulse signal comprises the first frequency signal generated based on the reference pulse signals and the first coefficient, and the second frequency signal generated based on the reference pulse signals and the first coefficient, wherein a ratio of the first frequency signal to the second frequency signal in the first pulse signal is controlled by the second coefficient.

9. The method according to claim 8, wherein the first rule comprises:
outputting the digital fingerprint based on a sequence of rising edges of the first pulse signal and the second pulse signal.

10. The method according to claim 8, further comprising:
receiving a first control signal; and
updating at least one of the control word and an initial phase control instruction in response to the first control signal, the initial phase control instruction being configured to control initial phases of the reference pulse signals, wherein different digital fingerprints are output in the case that the initial phases of the reference pulse signals are different.

11. The method according to claim 8, further comprising:
acquiring the output digital fingerprint, and simplifying the digital fingerprint by extracting data, in one of periods, of the digital fingerprint and deleting data of in the other periods, wherein the periods are determined based on a number of paths of the reference pulse signals, and the control word.

12. The digital fingerprint generator according to claim 1, wherein the first rule comprises:
outputting the digital fingerprint based on a sequence of falling edges of the first pulse signal and the second pulse signal.

13. The digital fingerprint generator according to claim 1, further comprising: a signal generator, connected to the first pulse generation circuit and the second pulse generation circuit, and configured to generate a plurality of reference pulse signals with uniformly spaced phases.

14. The digital fingerprint generator according to claim 2, further comprising:
a signal generator, connected to the first pulse generation circuit and the second pulse generation circuit, and configured to generate a plurality of reference pulse signals with uniformly spaced phases.

15. The digital fingerprint generator according to claim 3, further comprising:
a signal generator, connected to the first pulse generation circuit and the second pulse generation circuit, and configured to generate a plurality of reference pulse signals with uniformly spaced phases.

16. The method according to claim 8, wherein the first rule comprises:
outputting the digital fingerprint based on a sequence of falling edges of the first pulse signal and the second pulse signal.

17. The method according to claim 8, further comprising:
receiving a first control signal; and
updating at least one of the control word and an initial phase control instruction in response to the first control signal, the initial phase control instruction being configured to control initial phases of the reference pulse signals, wherein different digital fingerprints are output in the case that the initial phases of the reference pulse signals are different.

18. The method according to claim 8, further comprising:
acquiring the output digital fingerprint, and simplifying the digital fingerprint by extracting data, in one of periods, of the digital fingerprint and deleting data of in the other periods,
wherein the periods are determined based on a number of paths of the reference pulse signals, and the control word.

* * * * *